United States Patent
Horibe et al.

(10) Patent No.: US 10,109,877 B2
(45) Date of Patent: Oct. 23, 2018

(54) METHOD FOR PRODUCING FUEL CELL ELECTRODE SHEET

(71) Applicant: NISSAN MOTOR CO., LTD., Yokohama-shi, Kanagawa (JP)

(72) Inventors: Norifumi Horibe, Fujisawa (JP); Shigemasa Kuwata, Nishinomiya (JP); Kazufumi Kodama, Zushi (JP); Masaya Yamamoto, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/649,696

(22) PCT Filed: Nov. 15, 2013

(86) PCT No.: PCT/JP2013/080904
§ 371 (c)(1),
(2) Date: Jun. 4, 2015

(87) PCT Pub. No.: WO2014/091870
PCT Pub. Date: Jun. 19, 2014

(65) Prior Publication Data
US 2015/0349367 A1    Dec. 3, 2015

(30) Foreign Application Priority Data

Dec. 11, 2012 (JP) ................................. 2012-270237

(51) Int. Cl.
*H01M 4/88* (2006.01)
*H01M 8/10* (2016.01)
(Continued)

(52) U.S. Cl.
CPC ....... *H01M 8/1018* (2013.01); *H01M 4/8657* (2013.01); *H01M 4/8807* (2013.01);
(Continued)

(58) Field of Classification Search
CPC . H01M 2008/1095; H01M 2300/0082; H01M 4/8657; H01M 4/8807;
(Continued)

(56) References Cited

U.S. PATENT DOCUMENTS

2005/0266980 A1* 12/2005 Mada Kannan ... B01D 67/0088
502/101
2006/0115712 A1*  6/2006 Kim ..................... B82Y 30/00
429/483
(Continued)

FOREIGN PATENT DOCUMENTS

JP    2006092990 A    4/2006
JP    2006339124 A   12/2006
(Continued)

*Primary Examiner* — Barbara J Musser
(74) *Attorney, Agent, or Firm* — Young Basile Hanlon & MacFarlane, P.C.

(57) ABSTRACT

A micro porous layer and a catalyst layer are integrated into a sheet so that a fuel cell electrode sheet is formed. The electrode sheet is obtained by applying an MPL ink containing a carbon material and a binder to a supporting sheet and heat-treating the ink, and applying a catalyst ink containing a catalyst to the obtained micro porous sheet and drying it. An electrode assembly in which the electrode sheets is laminated onto both sides of a solid polymer electrolyte membrane, is obtained by laminating the electrode sheets formed on the supporting sheets to the solid polymer electrolyte membrane, and thereafter peeling off the supporting sheets.

8 Claims, 2 Drawing Sheets

(51) Int. Cl.
*H01M 8/1018* (2016.01)
*H01M 4/86* (2006.01)
H01M 8/1004 (2016.01)
H01M 8/0234 (2016.01)

(52) U.S. Cl.
CPC ........ H01M 4/8814 (2013.01); *H01M 8/0234* (2013.01); *H01M 8/1004* (2013.01); *H01M 2008/1095* (2013.01); *H01M 2300/0082* (2013.01)

(58) Field of Classification Search
CPC ............. H01M 4/8814; H01M 8/0234; H01M 8/1004; H01M 8/1018; Y02E 60/50
USPC .......................................... 427/115; 156/247
See application file for complete search history.

(56) References Cited

U.S. PATENT DOCUMENTS

| | | | |
|---|---|---|---|
| 2007/0072036 A1 | 3/2007 | Berta et al. | |
| 2009/0148726 A1* | 6/2009 | Ji .................. | H01M 8/0234 429/492 |
| 2009/0181235 A1* | 7/2009 | Owejan ............... | H01M 4/8814 428/315.9 |
| 2014/0120451 A1 | 5/2014 | Okuyama et al. | |

FOREIGN PATENT DOCUMENTS

| | | | |
|---|---|---|---|
| JP | 2007273457 A | 10/2007 | |
| JP | 2010108646 A | 5/2010 | |
| JP | 2010251290 A | 11/2010 | |
| JP | 2010251291 A | 11/2010 | |
| WO | 2011074327 A1 | 6/2011 | |
| WO | 2012172993 A1 | 12/2012 | |

* cited by examiner

METHOD FOR PRODUCING FUEL CELL ELECTRODE SHEET

CROSS REFERENCE TO RELATED APPLICATION

This application claims priority to Japanese Patent Application No. 2012-270237 (filing date: Dec. 11, 2012), which is incorporated herein by reference in its entirety.

TECHNICAL FIELD

The present invention relates to a method for producing a fuel cell electrode sheet including a micro porous layer (MPL) and a catalyst layer formed thereon used for a polymer electrolyte fuel cell (PEFC) and a method for producing the same, and further to a method for producing a membrane electrode assembly (MEA) using the electrode sheet and a method for producing the same.

BACKGROUND

Polymer electrolyte fuel cells using a proton-conductive solid polymer membrane are expected to serve as a power source of moving vehicles such as cars and are beginning to be put into practice since they can operate even at a low temperature compared to other fuel cells such as solid oxide fuel cells and fused carbonate fuel cells.

A gas diffusing electrode used in polymer electrolyte fuel cells includes an electrode catalyst layer containing carbon-supported catalyst particles coated with the same or a different ion-exchange resin (polymer electrolyte) from their polymer electrolyte membrane and a gas diffusion layer configured to supply a reactant gas to the catalyst layer and also to collect electric charge generated in the catalyst layer. A membrane electrode assembly (MEA) is formed by joining such a gas diffusion layer to a polymer electrolyte membrane with its catalyst layer facing the polymer electrolyte membrane. A polymer electrolyte fuel cell is formed by stacking a plurality of such membrane electrode assemblies with intervening separators including a gas channel.

One of the gas diffusion electrodes used in polymer electrolyte fuel cells known in the art includes a micro porous layer as an intermediate layer for decreasing the electric resistance between the gas diffusion layer and the catalyst layer and improving gas flow. The micro porous layer is mainly made of an electrically conductive material such as a carbon material and is disposed at the catalyst layer side of the gas diffusion layer.

Japanese Patent Unexamined Publication No. 2007-273457 discloses a method for producing such a polymer electrolyte fuel cell that involves applying a water-repellent layer composition to a gas diffusion layer so as to form a water-repellent layer, forming a catalyst electrode layer on the water-repellent layer and/or a solid polymer electrolyte membrane, and thereafter bonding the gas diffusion layer to the electrolyte membrane by means of thermal compression bonding with intervening the water repellent layer and the catalyst electrode layer therebetween. The gas diffusion layer is made of carbon fiber, and the water-repellent layer composition contains a water-repellent material such as fluororesin, an electrically conductive material such as carbon black, and a shape retaining material such as carbon fiber. The water-repellent layer formed from the composition corresponds to a micro porous layer.

However, in the production method disclosed in Japanese Patent Unexamined Publication No. 2007-273457, it is required to apply an excessive pressure during the thermal compression bonding of the solid polymer electrolyte membrane to the gas diffusion layer since the gas diffusion layer is compressed and deformed. Accordingly, the carbon fiber may dig into the electrolyte membrane to cause damage. Furthermore, applying a high pressure and a heat requires large equipment, which increases the production cost.

SUMMARY

The present invention was made in view of the above-described problems with the production of polymer electrolyte fuel cells, and an object thereof is to provide a method for producing an electrode sheet that enables joining a solid polymer electrolyte membrane to a catalyst layer with a low pressure and can thereby prevent damage on the electrolyte membrane and simplify the production process, and to provide a method for producing the electrode sheet. Another object is to provide a method for producing a membrane electrode assembly (MEA) using the electrode sheet and a method for producing the same.

As a result of diligent and constant study for achieving the above objects, the present inventors found that they can be achieved by using an electrode sheet including a micro porous layer and a catalyst layer formed thereon. The present invention was thus completed.

A method for producing a fuel cell electrode sheet of the present invention includes the steps of: applying an ink containing a carbon material and a binder to a supporting sheet and heat-treating the ink so as to form a micro porous sheet; and applying an ink containing a catalyst to the obtained micro porous sheet and drying the ink, wherein applying the ink containing the catalyst is carried out after the micro porous sheet is peeled off from the supporting sheet. A method for producing a membrane electrode assembly of the present invention involves laminating electrode sheets from which supporting sheets have been peeled off with a solid polymer electrolyte membrane.

In the present invention, the micro porous layer and the catalyst layer are integrated into a sheet so as to form the fuel cell electrode sheet. This enables joining the catalyst layer and the micro porous layer to the solid polymer electrolyte membrane with a low pressure, and can thereby prevent damage on the electrolyte membrane and simplify the production process and production facility.

EMBODIMENTS OF THE INVENTION

Figure 1:
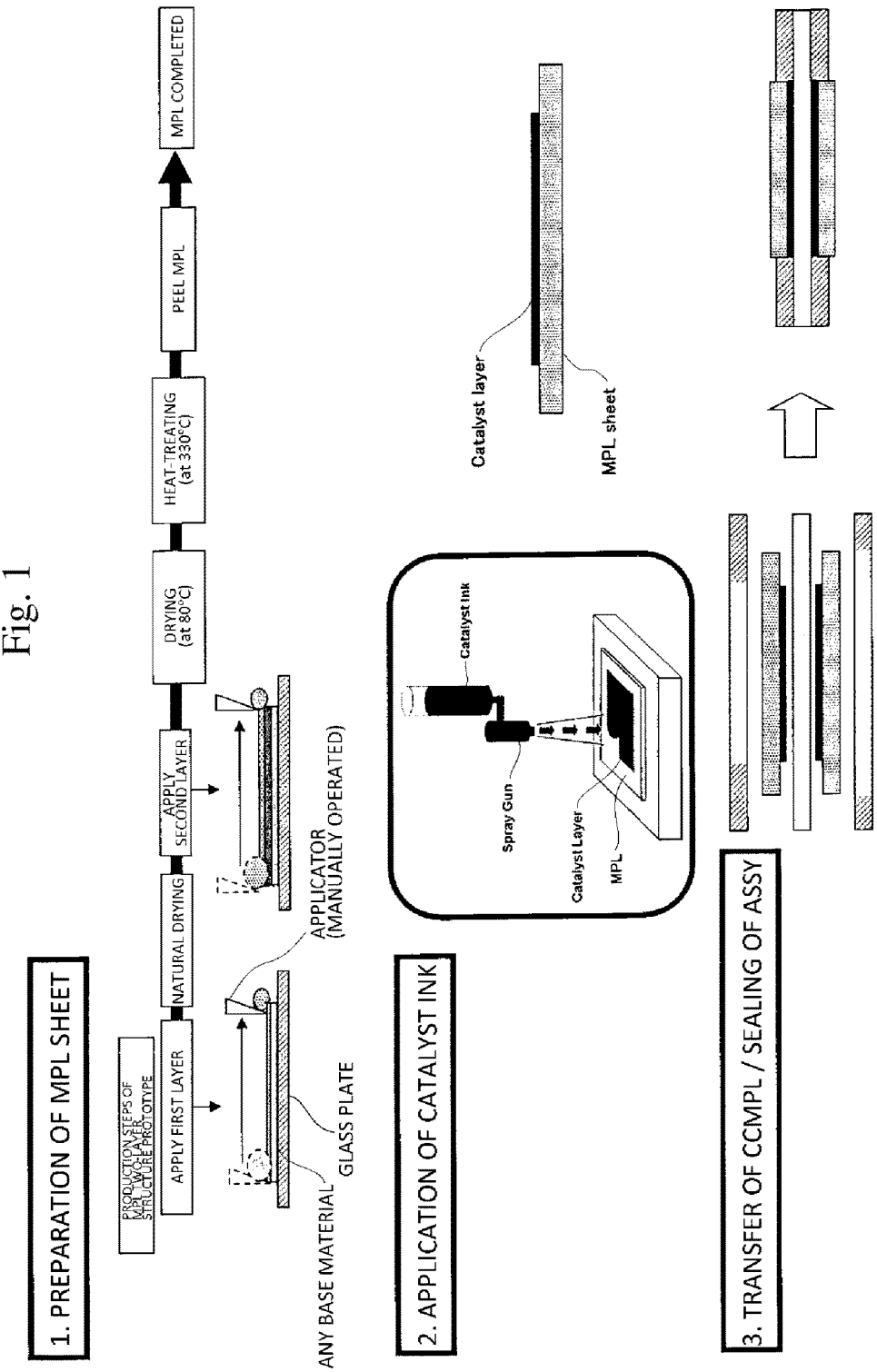
FIG. 1 illustrates an example of the steps of the method for producing a fuel cell electrode sheet according to the present invention.

Hereinafter, the fuel cell electrode sheet will be described in more detail about its material and production method. Further, the membrane electrode assembly using the fuel cell electrode sheet and the method for producing the membrane assembly will be described. As used herein, the symbol "%" represents mass percent unless otherwise noted.

The fuel cell electrode sheet includes a micro porous layer containing flake graphite and a binder, and a catalyst layer formed thereon, or includes a micro porous layer with a thickness within the range of 20 µm to 200 µm, containing a carbon material and a binder, and a catalyst layer formed thereon. It should be understood that the micro porous layer preferably has a thickness within the range of 20 μm to 200 μm, even when the micro porous layer contains flake graphite. That is, when the thickness of the micro porous layer is less than 20 μm, it is likely that the layer cannot keep its own shape as a sheet by itself, which may makes it difficult to form the catalyst layer or to laminate the layer with the solid polymer electrolyte membrane. When the thickness exceeds 200 μm, it is likely that the battery has increased internal resistance.

The properties required for the micro porous layer are different between the electrolyte membrane side and the separator side. Accordingly, it is desired that the micro porous layer has a multi-layer structure in terms of providing suitable properties to the respective sides.

Regarding the materials of the fuel cell electrode sheet, the materials used for the micro porous layer include a carbon material such as flake graphite and a binder.

The flake graphite is a highly crystalline material and has a scaly shape with a high aspect ratio (average plan diameter D/height H). As used herein, flake graphite refers to graphite having a height H within the range of 0.05 μm to 1 μm and an aspect ratio within the range approximately from 10 to 1000. Flake graphite improves gas permeability in the thickness direction and the in-plane direction and reduces the resistance (improves the electrical conductivity) in the in-plane direction of the micro porous layer. The average plan diameter D of flake graphite, which refers to the average diameter in the direction along a flat surface measured by a laser diffraction and scattering method, is suitably within the range of 5 μm to 50 μm. The flake graphite within this range can improve the electrical conductivity and the gas permeability without affecting the thickness of the micro porous layer. That is, when the average plan diameter is less than 5 μm, it is likely that the flake graphite cannot improve the gas permeability. When it is greater than 50 μm, it is likely that the effect of an additional electrically conductive path material becomes insufficient.

Other carbon materials that can be used include carbon black such as oil-furnace black, acetylene black, Ketjen black, thermal black and channel black, small-diameter flake graphite, carbon fiber and the like. They serve as an electrically conductive path material. The average particle size thereof is preferably equal to or greater than 10 nm and less than 5 μm.

Among them, acetylene black is desirably used since it has good dispersibility and can thereby improve the productivity. In this case, it is desirable that acetylene black is blended in a content in the micro porous layer within the range of 5% to 25% in terms of further ensuring the improvement of the gas permeability and the electrical conductivity in good balance. That is, when the content of acetylene black is less than 5%, it is likely that the contact area does not increase and the resistance does not decrease. When the content is greater than 25%, it is likely that small particles fill the void to degrade the gas permeability.

It is desired that the binder used along with the above-described carbon material has a function of binding the carbon material to each other to provide strength of the micro porous layer and also has a function as a water repellent agent. Typically, PTFE (polytetrafluoroethylene) is used for the binder. Further, tetrafluoroethylene-hexafluoropropylene copolymer (FEP), tetrafluoroethylene-perfluoroalkylvinylether copolymer (PFA) and the like may also be used.

In the fuel cell electrode sheet, the catalyst layer formed on the micro porous layer is prepared by mixing platinum or a platinum alloy supported by carbon (carbon black such as oil-furnace black, acetylene black, Ketjen black, thermal black and channel black, graphite, carbon fiber or the like) with perfluorosulfonic acid electrolytic solution or hydrocarbon electrolytic solution. A water repellent agent or a pore-forming agent may be further added according to need. The thickness of the catalyst layer formed on the micro porous layer is desirably within the range of 1 μm to 20 μm, more desirably within the range of 3 μm to 15 μm.

The fuel cell electrode sheet can be produced by the steps of: applying an ink (MPL ink) containing the carbon material and the binder to a supporting sheet and heat-treating the ink so as to form a micro porous sheet; and applying an ink (catalyst ink) containing a catalyst to the obtained micro porous sheet and drying the ink.

The supporting sheet may be constituted by any material that has a heat resistance and a chemical stability sufficient to withstand the drying or heat-treating step of the applied MPL ink or catalyst ink. For example, a film of polyimide, polypropylene, polyethylene, polysulfone, polytetrafluoroethylene or the like with a thickness within the range approximately from 10 μm to 100 μm is used. Among these films, a polyimide film is suitably used.

FIG. 1 illustrates an example of the production steps of the fuel cell electrode sheet. First, as illustrated in the figure, the MPL ink is applied to a base (supporting sheet) mounted on a glass plate by means of, in this example, a manual applicator. Then, after natural drying as needed, the second or higher layer of the MPL ink is applied, dried and heat-treated. Thereafter, the formed micro porous layer is peeled off from the supporting sheet. The micro porous layer is thus obtained.

Subsequently, the catalyst ink containing a catalyst component is applied onto the obtained micro porous layer by means of, for example, a spray gun, and is dried. The fuel cell electrode sheet in which the catalyst layer is formed on the micro porous layer sheet is thus obtained. Then, the fuel cell electrode sheets are joined onto both sides of the solid polymer electrolyte membrane such that the electrode sheets sandwich the electrolyte membrane with the catalyst layers facing inwardly, so that the membrane electrode assembly is obtained.

In the above-described method for producing the electrode sheet, the supporting sheet is peeled off after the micro porous layer is formed, and thereafter the catalyst layer is formed thereon. That is, as described above, the supporting sheet may be peeled off after the micro porous layer is formed, and the catalyst ink may be applied to the isolated micro porous sheet that is not accompanied with the supporting sheet.

The membrane electrode assembly includes the solid polymer electrolyte membrane and the above-described fuel cell electrode sheets laminated on both sides thereof.

The solid polymer electrolyte membrane used in the present invention may be constituted by a generally-used perfluorosulfonic acid electrolyte membrane or a hydrocarbon electrolyte membrane.

Such perfluorosulfonic acid electrolyte membranes include, for example, perfluorocarbon sulfonic acid polymers such as NAFION (registered trademark, DuPont Corp.), ACIPLEX (registered trademark, Asahi Kasei Corp.) and FLEMION (registered trademark, Asahi Glass Co., Ltd.), perfluorocarbon phosphonic acid polymers, trifluorostyrene sulfonic acid polymers, ethylene tetrafluoroethylene-g-styrene sulfonic acid polymers, ethylene-tetrafluoroethylene copolymer, polyvinylidene fluoride-perfluorocarbon sulfonic acid polymers and the like.

Further, such hydrocarbon polymer electrolytes include, for example, sulfonated polyether sulfone (S-PES), sulfonated polyaryletherketone, sulfonated polybenzimidazole alkyl, phosphonated polybenzimidazole alkyl, sulfonated polystyrene, sulfonated polyetheretherketone (S-PEEK), sulfonated polyphenylene (S-PPP) and the like.

The thickness of the solid polymer electrolyte membrane is not particularly limited, and may be suitably selected according to the properties of the fuel cell. However, the thickness is typically within the range approximately from 5 μm to 300 μm. With the polymer electrolyte membrane with a thickness within this numerical range, a good balance is achieved among the strength in film forming, the durability in use and the output properties in use.

The membrane electrode assembly can be produced, for example, by preparing the fuel cell electrode sheets produced by the above-described method, in which the micro porous layer and the catalyst layer are integrally laminated together into a sheet shape, and from which the supporting sheet has been already peeled off, and laminating them with the solid polymer electrolyte membrane with the catalyst layers facing inwardly.

Figure 2:
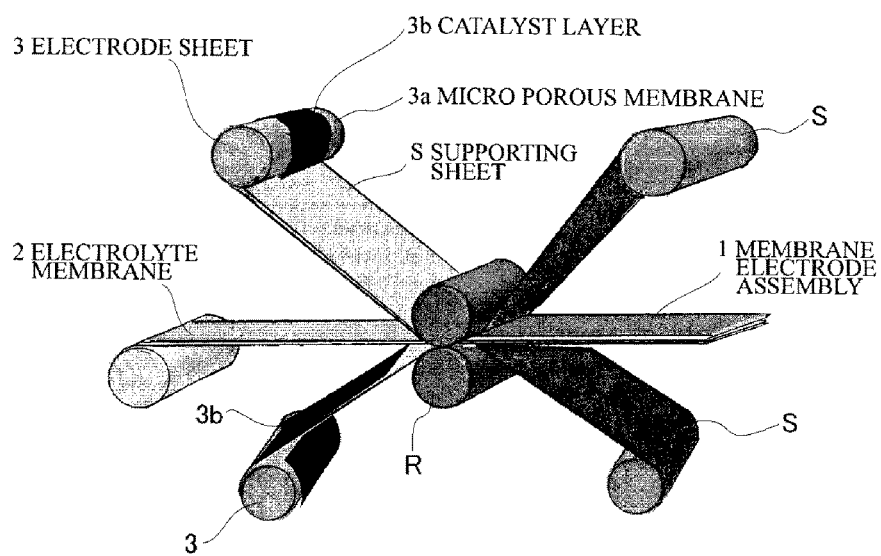
FIG. 2 is a perspective view illustrating an example of the method for producing a membrane electrode assembly outside the scope of the present invention.

FIG. 2 illustrates the summary of the production method outside the scope of the present invention. As illustrated in the figure, one end of the solid polymer electrolyte membrane 2 is drawn from a roll, and the electrode sheets 3 supported by the supporting sheets S, which have been also wound in respective rolls, are pressed against both sides of the solid polymer electrolyte membrane 2 with the catalyst layers 3b facing inwardly. Then, rollers R, which serve as transferring means, apply a pressure to join the micro porous layers 3a and the catalyst layers 3b of the electrode sheets 3 to the electrolyte membrane 2. At the outlet of the rollers R, the supporting sheets S are peeled off from the electrode sheets 3. The membrane electrode assembly 1 can be thus obtained.

In the method of the present invention, since the catalyst layers and the micro porous layers have been already joined to each other, a high pressure is not required when the catalyst layers and the electrolyte membrane are joined to each other. Therefore, damage on the electrolyte membrane can be prevented, and the production efficiency can be improved by simplifying the production facility and the production steps.

EXAMPLES

Hereinafter, the present invention will be specifically described based on the examples. However, it should be understood that the present invention is not limited to these examples.

Example 1

(1) Preparation of Micro Porous Sheet

An MPL ink for the micro porous layer was prepared that contains flake graphite with an average plan diameter of 15 μm, a thickness of 0.1 μm and a specific surface area of 6 m²/g, acetylene black (an electrically conductive path material) with a primary particle size of 40 nm and a specific surface area of 37 m²/g and PTFE as a binder in a ratio of 61.25%, 8.75% and 30% respectively. Then, the obtained MPL ink was applied to a heat-resistant supporting sheet constituted by a 25 μm-thick polyimide film. After drying at 80° C., the film was heat-treated at 330° C. Then, by peeling off from the supporting sheet, a micro porous sheet with a thickness of 60 μm was thus obtained.

(2) Preparation of Catalyst Ink

A supported catalyst TEC10E50E (Tanaka Kikinzoku Co., platinum content of 46 mass %, specific surface area of 314 m²/g) (7 g) in which platinum as a catalyst component is supported by carbon black (Ketjen black EC) as an electrically conductive support, 15.3 g (0.9 in a mass ratio with respect to 1 mass of the electrically conductive support) of NAFION (registered trademark, DuPont Corp.) dispersion D-2020 (ion exchange capacity of 1.0 mmol/g, electrolyte content of 20 mass %) as a polymer electrolyte dispersion, 78.3 g of ion-exchanged water, and 48.6 g of 1-propanol were mixed and dispersed together by means of a bead mill so that a catalyst ink was obtained.

(3) Application of Catalyst Ink to Micro Porous Sheet

The catalyst ink obtained in the above step (2) was applied onto one side of the micro porous sheet obtained in the above step (1) to the size of 5 cm×2 cm by means of a spray applicator. The ink was dried to form the catalyst layer. The fuel cell electrode sheet was thus formed. The thickness of the catalyst layer was within the range of 2 μm to 3 μm for an anode and 10 μm for a cathode.

(4) Preparation of MEA

NAFION (registered trademark) NR211 (DuPont Corp.) was employed as a solid polymer electrolyte membrane. The fuel cell electrode sheets obtained in the above step (3) were joined onto both sides of the electrolyte membrane such that their catalyst layers came in contact with the electrolyte membrane. A membrane electrolyte assembly was thus prepared. The joining was carried out by means of hot press in the conditions of 150° C., 10 min and 0.8 MPa. Subsequently, the membrane electrode assembly was joined to a 200 μm-thick carbon paper with water repellent finish (10%) by means of hot press (80° C., 0.8 MPa, 10 min). The membrane electrode assembly with a carbon paper was thus obtained.

(Comparison 1)

(1) Preparation of Catalyst Transferring Sheet

The same ink as that of Example 1 was applied to PTFE sheets respectively for an anode and a cathode to a size of 5 cm×2 cm. The ink was dried so that catalyst layer transferring sheets were prepared.

(2) Preparation of MEA

By using the transferring sheets obtained in the above step (1), the catalyst layers were transferred onto both sides of the same solid polymer electrolyte membrane as that of the above-described example, i.e. NAFION (registered trademark) NR211 (DuPont Corp.). A membrane electrode assembly was thus prepared. The transferring was carried out in the conditions of 150° C., 10 min and 0.8 MPa.

(3) Joining of GDL

Commercially available GDLs (25BCH, SGL Carbon Japan Co., Ltd.) were joined to the membrane electrode assembly transferred in the above step (2) (80° C., 10 min and 0.8 MPa) so that the membrane electrode assembly of the comparison was obtained.

In this comparison, the catalyst layer transferring sheets were transferred to the solid polymer electrolyte membrane, and the GDLs were further joined thereon.

In contrast, in the example of the present invention, the electrode sheets in which the micro porous layer and the catalyst layer were integrated into a sheet were used. Therefore, a base for the catalyst transferring sheets and a joining step of the micro porous sheets are not required. As a result, the reduction of the material and the man-hour allows cost reduction.

On the other hand, the membrane electrode assemblies of Example 1 and Comparison 1 (active area: 5 cm×2 cm) were evaluated for power generation by using small single cells composed of the respective membrane electrode assemblies in the conditions of $H_2/O_2$, 80° C. and 200 kPa_a. The voltage and the resistance were measured at a current of 2 $A/cm^2$ when the relative humidity in both anode and cathode is 40% RH (dry condition) or 90% RH (moist condition). The example and the comparison exhibited approximately the same voltage and resistance. Accordingly, it was found that there is little difference in performance between them.

While the present invention was described with embodiments and examples, the present invention is not limited thereto, and various modifications can be made within the gist of the present invention.

The invention claimed is:

1. A method for producing a fuel cell electrode sheet consisting of a micro porous sheet and a catalyst layer, comprising the steps of:
    applying a micro-porous layer (MPL) ink containing a carbon material and a binder to a supporting sheet;
    heat-treating the MPL ink so as to form the micro porous sheet;
    peeling the micro porous sheet off the supporting sheet;
    directly applying a catalyst ink containing a catalyst to the micro porous sheet and drying the catalyst ink to obtain the catalyst layer, wherein applying the catalyst ink containing the catalyst is carried out after the supporting sheet is peeled off from the micro porous sheet; and
    integrally laminating the micro porous sheet and the catalyst ink.

2. The method of claim 1, wherein
    the carbon material is flake graphite and/or particulate carbon black, and
    the micro porous sheet is made of the flake graphite and/or the particulate carbon black and the binder.

3. A method for producing a fuel cell electrode sheet consisting of a micro porous sheet and a catalyst layer, comprising the steps of:
    applying a micro-porous layer (MPL) ink containing a carbon material and a binder to a supporting sheet;
    heat-treating the MPL ink so as to form the micro porous sheet;
    peeling the micro porous sheet off the supporting sheet;
    directly applying a catalyst ink containing a catalyst to the micro porous sheet and drying the catalyst ink to obtain the catalyst layer;
    integrally laminating the micro porous sheet and the catalyst ink; and
    laminating the fuel cell electrode sheet with a solid polymer electrolyte membrane.

4. A method for producing a membrane electrode assembly, comprising:
    producing a fuel cell electrode sheet consisting of a micro porous sheet and a catalyst layer by steps comprising:
        applying, to a supporting sheet, a single layer consisting of a micro-porous layer (MPL) ink, the MPL ink containing a carbon material and a binder;
        heat-treating the MPL ink so as to form the micro porous sheet; and
        applying a catalyst ink containing a catalyst directly to the micro porous sheet and drying the catalyst ink to obtain the catalyst layer,
            wherein applying the catalyst ink containing the catalyst is carried out after the supporting sheet is peeled off from the micro porous sheet; and
    laminating, with a solid polymer electrode membrane, the fuel cell electrode sheet.

5. The method of claim 4, wherein applying the catalyst ink containing the catalyst to the micro porous sheet comprises:
    applying the catalyst ink to the micro porous sheet using a spray gun.

6. The method of claim 4, wherein
    the catalyst ink has a thickness in a first range of 2 μm to 3 μm when the fuel cell electrode sheet is used as an anode, and
    the catalyst ink has a thickness in a second range of 10 μm to 20 μm when the fuel cell electrode sheet is used as a cathode.

7. The method of claim 4, wherein the carbon material is acetylene black constituting 5% to 25% of the micro porous sheet.

8. The method of claim 4, wherein
    the carbon material is flake graphite and/or particulate carbon black, and
    the micro porous sheet is made of the flake graphite and/or the particulate carbon black and the binder.

* * * * *